(12) United States Patent
Crue, Jr. et al.

(10) Patent No.: US 6,417,998 B1
(45) Date of Patent: Jul. 9, 2002

(54) ULTRA SMALL ADVANCED WRITE TRANSDUCER AND METHOD FOR MAKING SAME

(75) Inventors: Billy W. Crue, Jr.; Zhupei Shi, both of San Jose; Vijay K. Dhingra, Fremont; Sean Yao, Milpitas, all of CA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 09/274,187

(22) Filed: Mar. 23, 1999

(51) Int. Cl.$^7$ .............................. G11B 5/39; G11B 5/31
(52) U.S. Cl. .......................................... 360/317; 360/126
(58) Field of Search ................................. 360/119, 122, 360/123, 125, 126, 317

(56) References Cited

U.S. PATENT DOCUMENTS

| | | | |
|---|---|---|---|
| 4,677,036 A | 6/1987 | Nakumura et al. | 428/694 R |
| 4,791,719 A | 12/1988 | Kobayashi et al. | 29/603.14 |
| 4,816,946 A * | 3/1989 | Kira et al. | 360/126 |
| 5,045,961 A | 9/1991 | Kobayashi et al. | 360/126 |
| 5,161,299 A | 11/1992 | Denison et al. | 360/121 |
| 5,189,580 A | 2/1993 | Pisharody et al. | 360/126 |
| 5,224,003 A | 6/1993 | Matsui | 360/126 |
| 5,241,440 A * | 8/1993 | Ashida et al. | 360/126 |
| 5,270,895 A | 12/1993 | Ruigrok et al. | 360/126 |
| 5,282,308 A | 2/1994 | Chen et al. | 360/125 |
| 5,283,942 A | 2/1994 | Chen et al. | 360/126 |
| 5,406,695 A | 4/1995 | Amemori | 360/122 |
| 5,435,053 A | 7/1995 | Krounbi et al. | 29/603.25 |
| 5,448,822 A * | 9/1995 | Wu et al. | 360/126 |
| 5,546,650 A | 8/1996 | Dee | 29/603.16 |
| 5,576,098 A | 11/1996 | Arimoto et al. | 360/126 |
| 5,581,429 A | 12/1996 | Furuichi et al. | 360/126 |
| 5,621,596 A | 4/1997 | Santini | 360/126 |
| 5,649,351 A | 7/1997 | Cole et al. | 29/603.14 |
| 5,691,861 A | 11/1997 | Ohba | 360/245.8 |
| 5,700,380 A | 12/1997 | Krounbi et al. | 216/22 |
| 5,722,157 A | 3/1998 | Shouji et al. | 29/603.14 |
| 5,751,522 A * | 5/1998 | Yamada et al. | 360/126 |
| 5,828,522 A * | 10/1998 | Ohashi et al. | 360/126 |
| 5,923,506 A * | 7/1999 | Herrera | 360/126 |
| 6,002,555 A * | 12/1999 | Tagawa | 360/126 |
| 6,043,959 A * | 3/2000 | Crue et al. | 360/317 |
| 6,088,197 A * | 8/2000 | Tsuda | 360/126 |
| 6,151,193 A * | 11/2000 | Terunuma et al. | 360/126 |

* cited by examiner

*Primary Examiner*—David L. Ometz
(74) *Attorney, Agent, or Firm*—Carr & Ferrell LLP

(57) ABSTRACT

A magnetoresistive write element having a planar coil layer between a first pole and a second pole. The magnetoresistive write element further includes a buildup insulation layer having an upper surface that is substantially coplanar with an upper surface of the first pole. Further, the planar coil layer is disposed above both the first pole and the buildup insulation layer. A method for forming a magnetoresistive write element includes providing a first pole and covering the first pole with an insulating layer. The insulating layer is then planarized, thereby exposing the first pole and defining a buildup insulation layer. This planarization also results in the formation of a substantially planar upper surface of the buildup insulation layer and a substantially planar upper surface of the first pole. More specifically, the first pole upper surface is substantially coplanar with the buildup insulation layer upper surface. The method also includes forming a write gap material layer above the insulation layer and first pole, and forming a substantially planar coil layer above said write gap material layer. In addition, a second pole is formed above the write gap material layer, with the coil layer thereby disposed between the first pole and the second pole.

34 Claims, 9 Drawing Sheets

ULTRA SMALL ADVANCED WRITE TRANSDUCER AND METHOD FOR MAKING SAME

BACKGROUND OF THE INVENTION

This invention relates generally to magnetic disk data storage systems, and more particularly to magnetic write transducers and methods for making same.

Magnetic disk drives are used to store and retrieve data for digital electronic apparatuses such as computers. In FIGS. 1A and 1B, a magnetic disk data storage systems 10 of the prior art includes a sealed enclosure 12, a disk drive motor 14, a magnetic disk 16, supported for rotation by a drive spindle S1 of motor 14, an actuator 18 and an arm 20 attached to an actuator spindle S2 of actuator 18. A suspension 22 is coupled at one end to the arm 20, and at its other end to a read/write head or transducer 24. The transducer 24 (which will be described in greater detail with reference to FIG. 2A) typically includes an inductive write element with a sensor read element. As the motor 14 rotates the magnetic disk 16, as indicated by the arrow R, an air bearing is formed under the transducer 24 causing it to lift slightly off of the surface of the magnetic disk 16, or, as it is termed in the art, to "fly" above the magnetic disk 16. Alternatively, some transducers, known as "contact heads," ride on the disk surface. Various magnetic "tracks" of information can be written to and/or read from the magnetic disk 16 as the actuator 18 causes the transducer 24 to pivot in a short arc as indicated by the arrows P. The design and manufacture of magnetic disk data storage systems is well known to those skilled in the art.

FIG. 2A depicts a magnetic read/write head 24 including a substrate 25 above which a read element 26 and a write element 28 are disposed. Edges of the read element 26 and write element 28 also define an air bearing surface ABS, in a plane 29, which can be aligned to face the surface of the magnetic disk 16 (see FIGS. 1A and 1B). The read element 26 includes a first shield 30, an intermediate layer 32, which functions as a second shield, and a read sensor 34 that is located within a dielectric medium 35 between the first shield 30 and the second shield 32. The most common type of read sensor 34 used in the read/write head 24 is the magnetoresistive (AMR or GMR) sensor which is used to detect magnetic field signals from a magnetic medium through changing resistance in the read sensor.

The write element 28 is typically an inductive write element which includes the intermediate layer 32, which functions as a first pole, and a second pole 38 disposed above the first pole 32. The first pole 32 and the second pole 38 are attached to each other by a backgap portion 40, with these three elements collectively forming a yoke 41. The combination of a first pole tip portion 43 and a second pole tip portion 45 near the ABS are sometimes referred to as the yoke tip portion 46. A write gap 36 is formed between the first and second poles 32, 38 in the yoke tip portion 46. The write gap 36 is filled with a non-magnetic electrically insulating material that forms a write gap material layer 37. This non-magnetic material can be either integral with (as is shown here) or separate from a first insulation layer 47 that lies below the second yoke 38 and extends from the yoke tip portion 46 to the backgap portion 40.

Also included in write element 28 is a conductive coil 48, formed of multiple winds 49 which each have a wind height Hw. The coil 48 can be characterized by a dimension sometimes referred to as the wind pitch P, which is the distance from one coil wind front edge to the next coil wind front edge, as shown in FIG. 2A. As is shown, the wind pitch P is defined by the sum of the wind thickness Tw and the separation between adjacent winds Sw. The conductive coil 48 is positioned within a coil insulation layer 50 that lies above the first insulation layer 47. The first insulation layer 47 thereby electrically insulates the coil layer from the first pole 32, while the coil insulation layer 50 electrically insulates the winds 49 from each other and from the second pole 38.

The configuration of the conductive coil 48 can be better understood with reference to a plan view of the read/write head 24 shown in FIG. 2B taken along line 2B—2B of FIG. 2A. Because the conductive coil extends beyond the first and second poles, insulation may be needed beneath, as well as above, the conductive coil to electrically insulate the conductive coil from other structures. For example, as shown in FIG. 2C, a view taken along line 2C—2C of FIG. 2A, a buildup insulation layer 52 can be formed adjacent the first pole, and under the conductive coil layer 48. As is well known to those skilled in the art, these elements operate to magnetically write data on a magnetic medium such as a magnetic disk 16 (see FIGS. 1A and 1B).

More specifically, an inductive write head such as that shown in FIGS. 2A–2C operates by passing a writing current through the conductive coil layer 48. Because of the magnetic properties of the yoke 41, a magnetic flux is induced in the first and second poles 32, 38 by write currents passed through the coil layer 48. The write gap 36 allows the magnetic flux to fringe out from the yoke 41 (thus forming a fringing gap field) and to cross a magnetic recording medium that is placed near the ABS. A critical parameter of a magnetic write element is a trackwidth of the write element, which defines track density. For example, a narrower trackwidth can result in a higher magnetic recording density. The trackwidth is defined by geometries in the yoke tip portion 46 (see FIG. 2A) at the ABS. These geometries can be better understood with reference to FIG. 2C. As can be seen from this view, the first and second poles 32, 38 can have different widths W1, W2 respectively in the yoke tip portion 46 (see FIG. 2A). In the shown configuration, the trackwidth of the write element 28 is defined by the width W2 of the second pole 38. The gap field of the write element can be affected by the throat height TH, which is measured from the ABS to the zero throat ZT, as shown in FIG. 2A. Thus, accurate definition of the trackwidth and throat height is critical during the fabrication of the write element.

Another parameter of the write element is the number of winds 49 in the coil layer 48, which determines magnetic motive force (MMF) of a write element. With increasing number of winds 49 between the first and second poles 32, 38, the fringing field is stronger and, thus, the write performance increases. The number of winds is limited by the yoke length YL, shown in FIG. 2A, and the pitch P between adjacent winds 49. However, to obtain faster recording speeds, and therefore higher data transfer rates, it may be desirable to have a shorter yoke length YL because this can shorten the flux rise time. This relationship can be seen in the graph of yoke length YL versus flux rise time shown in FIG. 2D. Therefore, to maximize the number of coil winds while maintaining fast write speeds, it is desirable to minimize the pitch P in design of write elements.

However, the control of trackwidth, throat height, and coil pitch can be limited by typical fabrication processes, an example of which is shown in the process diagram of FIG. 2. The method 54 includes providing a first pole with first and second edges in operation 56. This operation can include, for example, forming a plating dam, plating, and then removing the dam. In operation 58, a write gap material layer is formed over the first pole. In particular, the write gap material layer is formed over an upper surface and the first and second edges of the first pole. Also, in operation 58, a via is formed through the write gap material layer to the first pole in the backgap portion 40 (see FIG. 2A). In the instance herein described, the write gap material layer extends above the first pole in the area between the yoke tip portion and the backgap portion, although in other cases the write gap material layer may not be above this area. A buildup insulation layer is also formed in operation 60, adjacent the first and second edges, with the write gap material layer between the first pole and the buildup insulation layer. The buildup insulation layer is typically formed by depositing (e.g., spinning) and patterning photoresistive material and then hard baking the remaining photoresistive material. Such processes often result in the height of the buildup insulation layer being non-uniform and different than the height of the write gap material layer, as is illustrated in FIGS. 2A and 2C.

The method 54 also includes forming a first coil layer above the write gap material layer and the buildup insulation layer in operation 62. This can include first depositing a seed layer above the first pole. Typically, photoresistive material can then be deposited and patterned. With the patterned photoresistive material in place, conductive material can be plated. With removal of the photoresistive material, the remaining conductive material thereby forms the first coil layer.

Unfortunately, when there is a difference in height between the write gap material layer and the buildup insulation layer, the patterning of the photoresistive material for the first coil layer can be complicated. In particular, it can be difficult to pattern the various heights to have consistent geometries. More specifically, winds of the resulting first coil layer can be wider at lower levels than at higher levels, such as between the first and second poles. Thus, for a given pitch, such greater width at the lower levels can result in smaller distances between winds. This can, in turn, result in electrical shorting between winds which can be detrimental to the write element performance. To avoid such electrical shorting, the minimum wind pitch can be set to a desired value that will result in adequate yield of nonshorting conductive coil layers. Because the coil winds are more narrow between the first and second poles, the resulting pitch there is typically greater than, and limited by this minimum. For example, typical wind pitches between the first and second poles may be limited to no less than about 3 microns. For a given number of winds and wind thickness, this in turn limits the minimum yoke length, and thereby limits the data transfer rate and data density as described above. For example, a pitch of about 3 microns may be adequate for recording densities on the order of about 2 Gb/sq.in., however, these typical pitches can be inadequate for larger recording densities, such as about 10 Gb/sq.in.

In operation 64, the method 54 further includes forming a coil insulation layer above the first coil layer that is formed in operation 62. In addition, a second pole is formed above the coil insulation layer of operation 64, in operation 66.

Still another parameter of the write element is the stack height SH, the distance between the top surface of the first pole 32 and the top of the second pole 38, as shown in FIG. 2A. Of course, this height is affected by the thickness of the first insulation layer 47, the thickness of the coil layer 48 and any other coil layers that might be included, and the height Hi of the coil insulation layer 50 and any other coil insulation layers that might be included. The stack height SH can be an indicator of the apex angle $\alpha$, which partially characterizes the topology over which the second pole must be formed near the yoke tip portion. Typically, the reliability of the write element decreases as the apex angle $\alpha$ increases. This is due, at least in part, to the corresponding increased difficulty, particularly in the yoke tip portion 46, of forming the second pole 38 over the higher topography of the stack. For example, the definition of the second pole width W, shown in FIG. 2C, including photoresist deposition and etching, can be decreasingly reliable and precise with increasing topography. When demand for higher density writing capabilities drives yoke tip portions to have smaller widths W, this aspect of fabrication becomes increasingly problematic.

Greater trackwidth control can be attempted using other processes such as focused ion beam (FIB) milling, however such processes can be expensive. To support higher data transfer rate applications, the second pole can otherwise be formed by lamination, which can be more time consuming than without lamination. Alternatively, the trackwidth can be defined by the first pole width W1. However, such processes can also be expensive, complex, and result in lower production yields.

Also, with higher topography, when the second pole is formed, for example by sputtering or plating, the material properties of the second pole in the sloped region, adjacent the second pole tip region 45, can be undesirable. Thus, this decreased reliability results in undesirable lower production yield.

Accordingly, what is desired is a write element with coil pitch of less than 3 microns, more accurate definition of second pole defined trackwidth, throat height, and apex angle, and a thinner coil insulation layer above the coil layer.

SUMMARY OF THE INVENTION

The present invention provides a magnetic write element and method for making the same that provides high writing performance in high density and high data rate applications, and can be fabricated with high yield. Specifically, a write element is provided which has a small coil pitch, good trackwidth and throat height definition control, and low stack height.

In an embodiment of the present invention, a magnetoresistive device for writing data on a magnetic medium includes a first pole and an insulation layer having a substantially planar upper surface that is in a plane. Also included is a write gap material layer disposed above the first pole, and a second pole disposed above the write gap material layer. The magnetoresistive device further includes a conductive coil layer having a first portion that is disposed between the first pole and the second pole, and having a second portion that is disposed above the insulation layer. In addition, the first portion and the second portion of the conductive coil layer are substantially coplanar.

In another embodiment of the present invention, a method for forming a device for writing data on a magnetic medium includes providing a first pole and forming an insulation layer covering the first pole. The method also includes performing a chemical-mechanical polishing procedure on the insulation layer, thereby forming an upper surface of the insulation layer that is substantially planar. Forming a write gap material layer above the first pole and forming a second pole above the write gap material layer are also included in the method. In addition, the method includes forming a first coil layer between the first pole and the second pole, as well as forming a first coil insulation layer between the first coil layer and the second pole.

By providing a planar surface below the coil layer, and thereby including a planar coil layer, the present invention results in a write element that has smaller coil wind pitch, greater coil wind height, and more precise control of the write trackwidth and throat height. These improvements can therefore result in greater write performance, including use in high density and data rate applications. Further, these advantages can be realized in the present invention with minimal expense, complexity, and time.

These and other advantages of the present invention will become apparent to those skilled in the art upon a reading of the following descriptions of the invention and a study of the several figures of the drawings.

BRIEF DESCRIPTION OF THE DRAWINGS

The present invention will be readily understood by the following detailed description in conjunction with the accompanying drawings, with like reference numerals designating like elements.

DETAILED DESCRIPTION OF THE PREFERRED EMBODIMENTS

FIGS. 1A, 1B, 2A–C, and 3 were discussed with reference to the prior art.

Figure 1A:
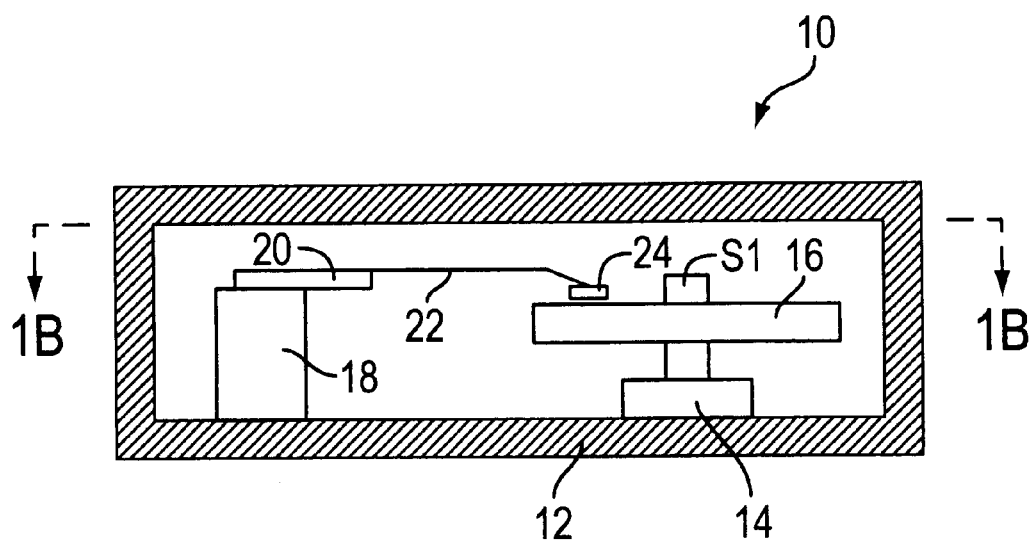
FIG. 1A is a partial cross-sectional front elevation view of a magnetic data storage system.
Figure 1B:
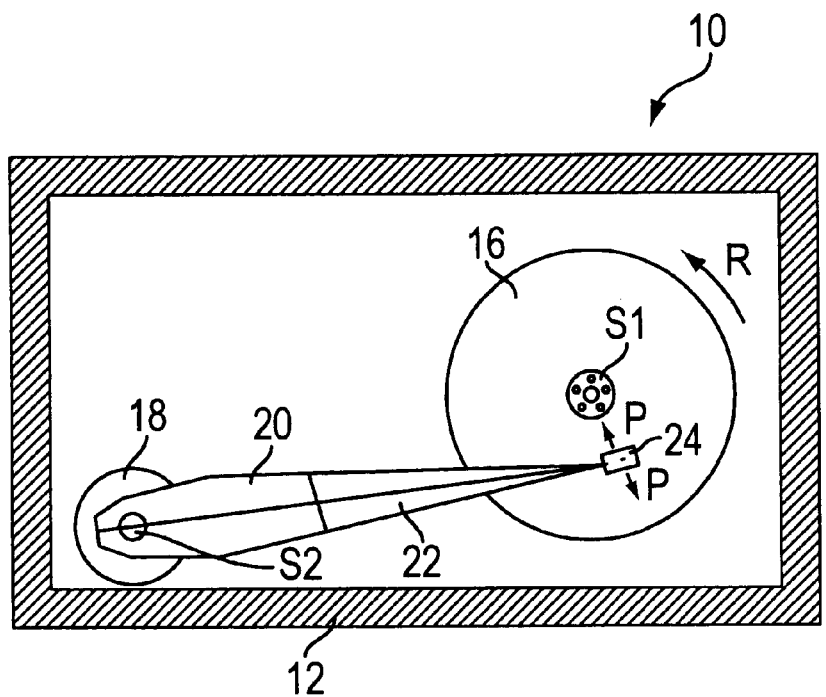
FIG. 1B is a top plan view taken along line 1B—1B of FIG. 1A.
Figure 2A:
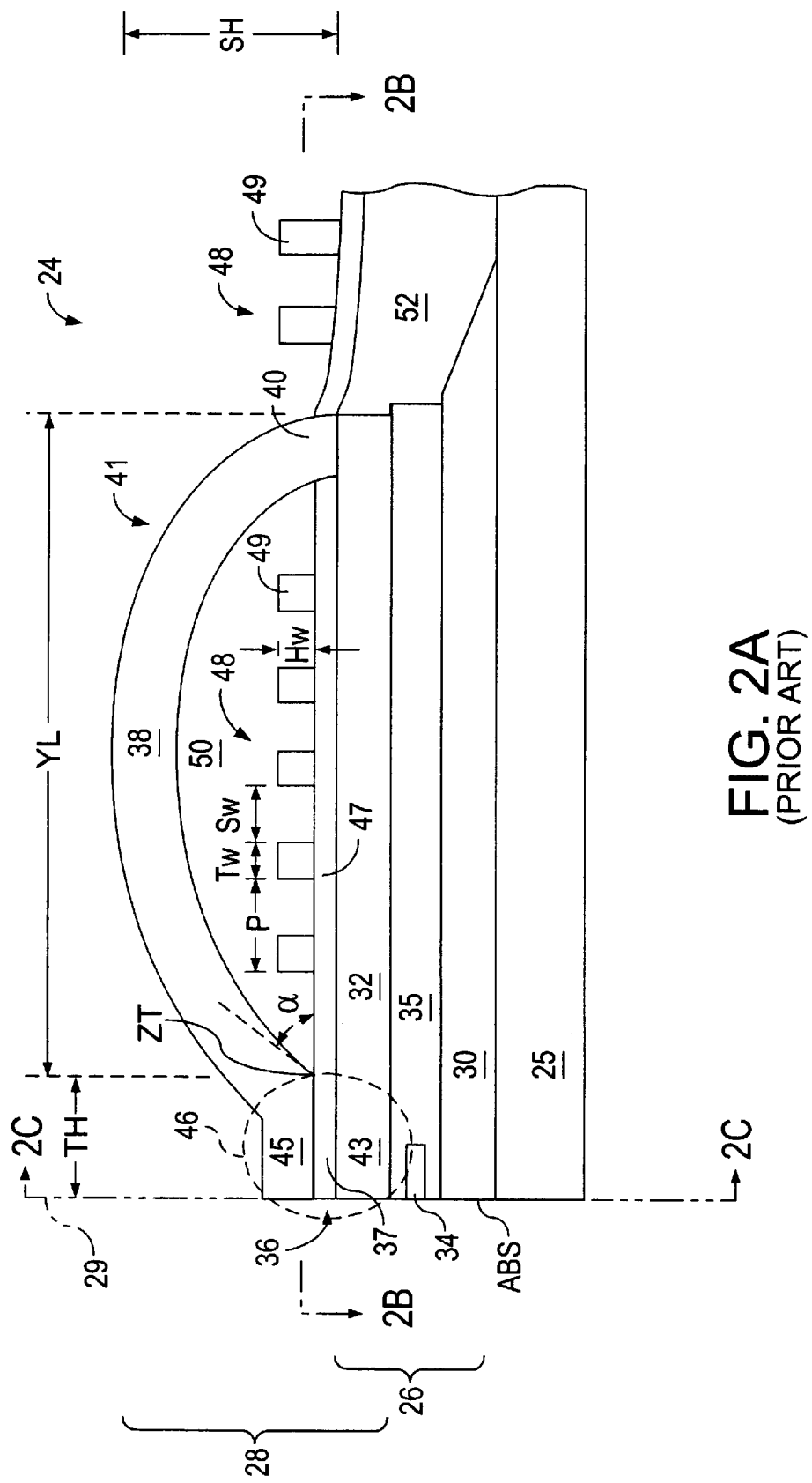
FIG. 2A is a cross-sectional view of a prior art read/write head of the magnetic disk drive assembly of FIGS. 1A and 1B.
Figure 2B:
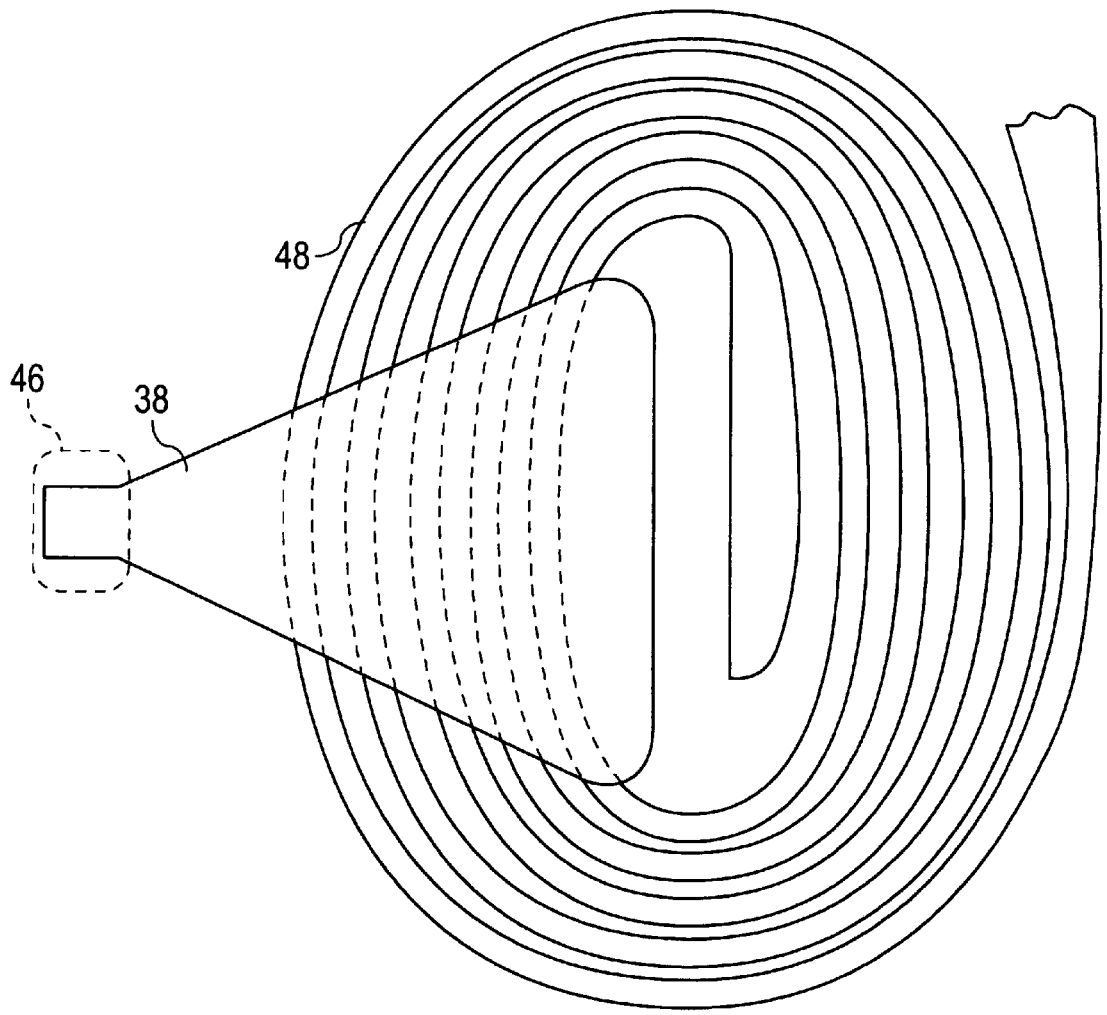
FIG. 2B is a plan view taken along line 2B—2B of FIG. 2A.
Figure 2C:
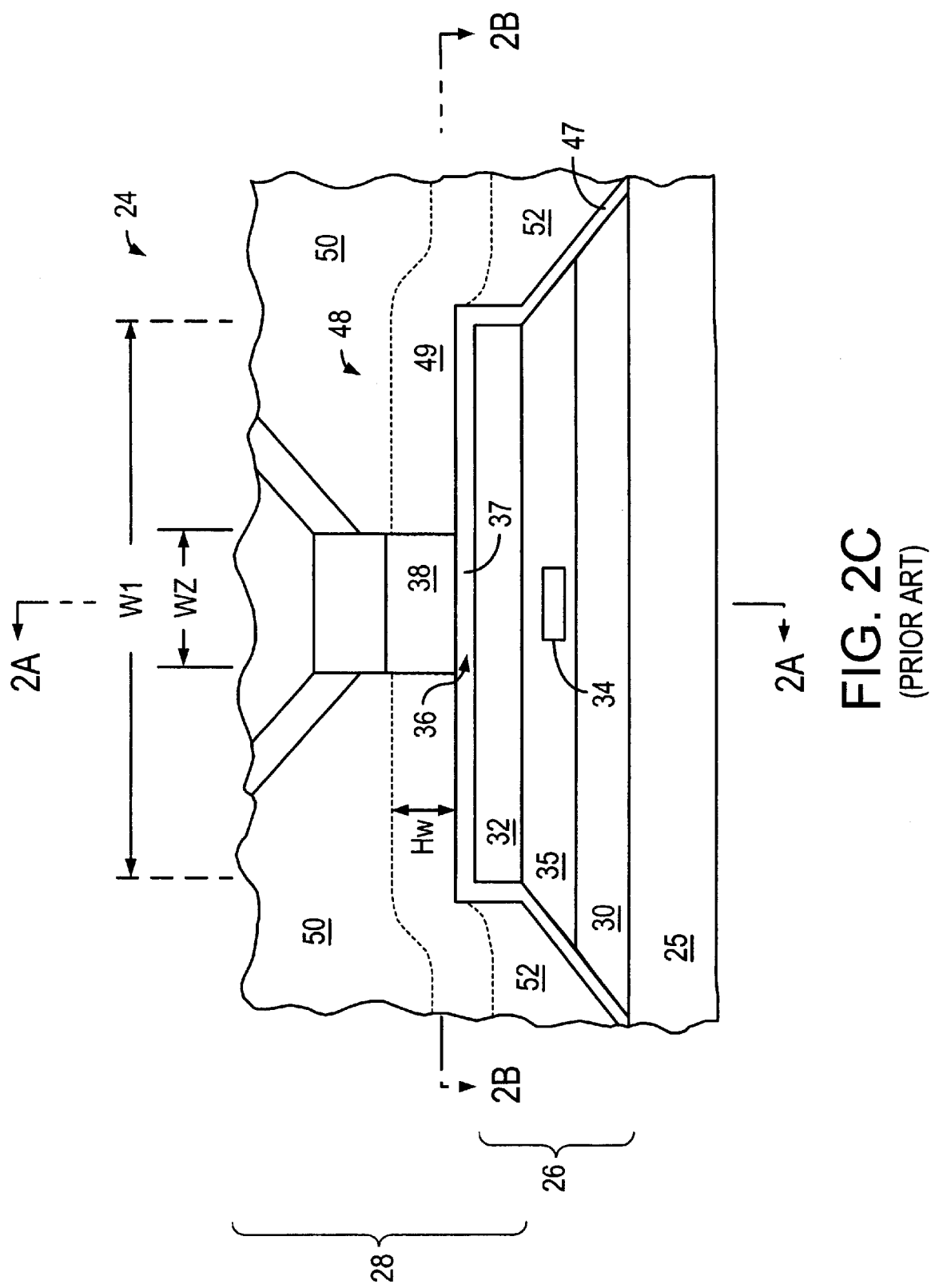
FIG. 2C is an ABS view taken along line 2C—2C of FIG. 2A.
Figure 2D:
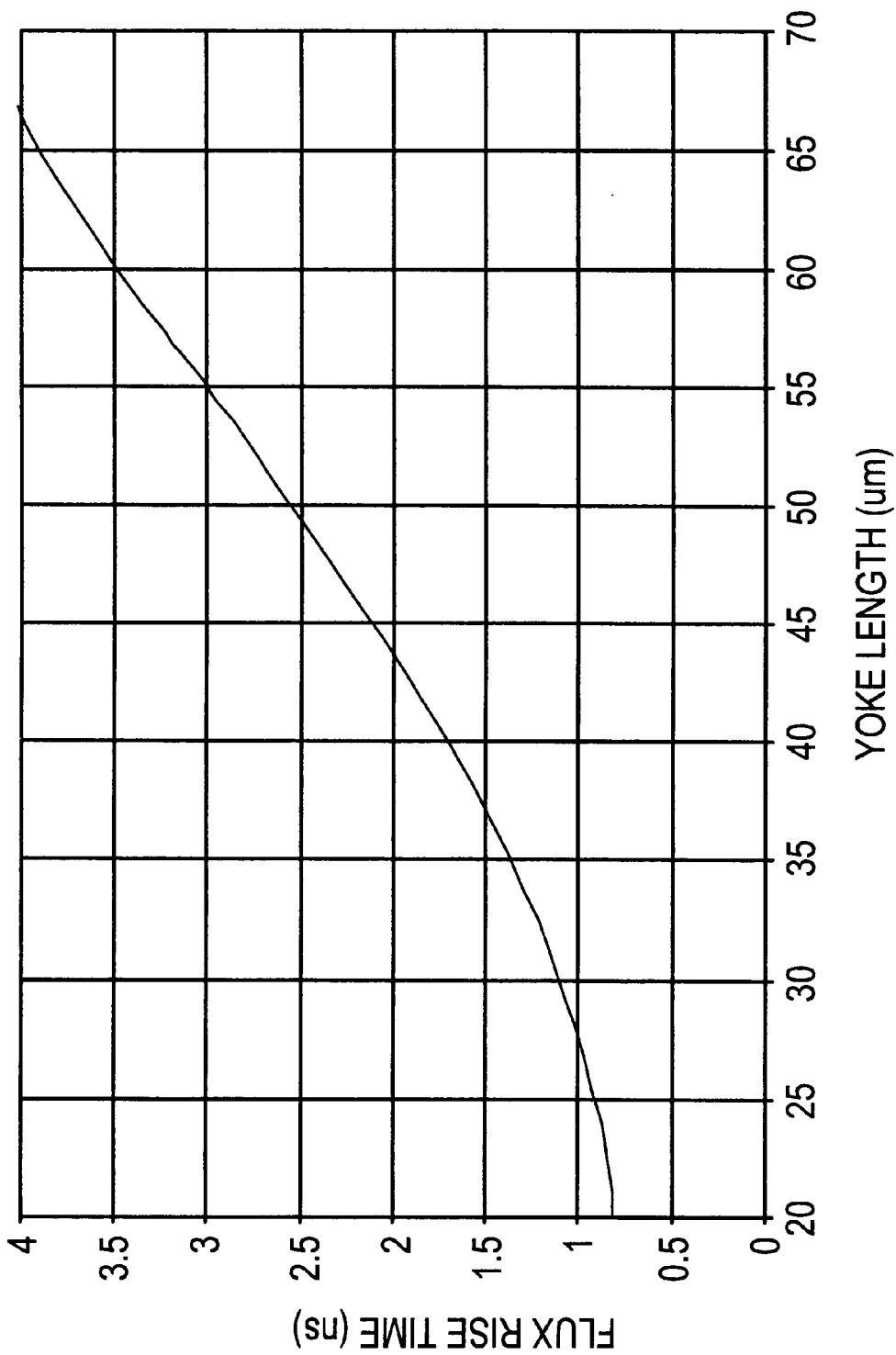
FIG. 2D is a representative graph of a relationship between yoke length and flux rise time.
Figure 3:
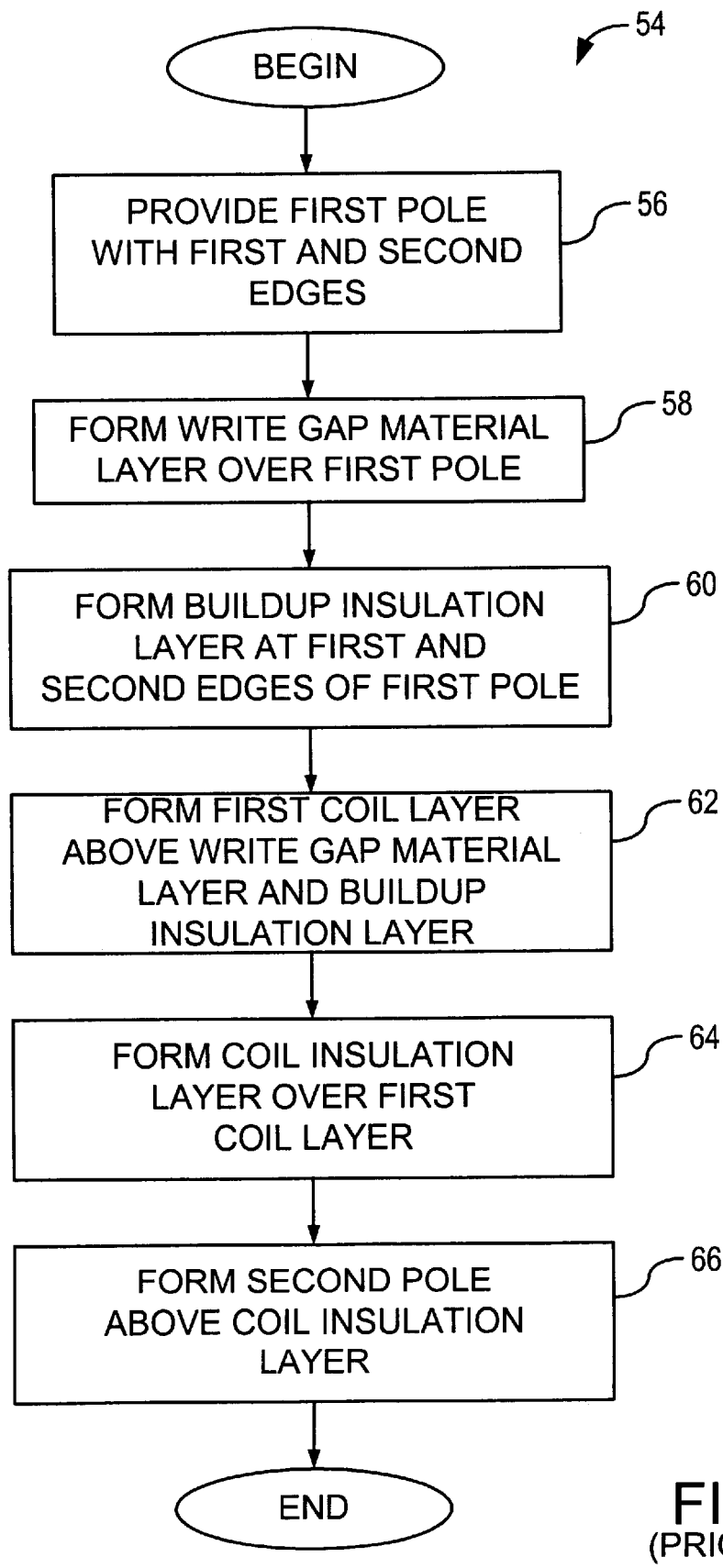
FIG. 3 is a process diagram of a method for forming a write element of the prior art.
Figure 4A:
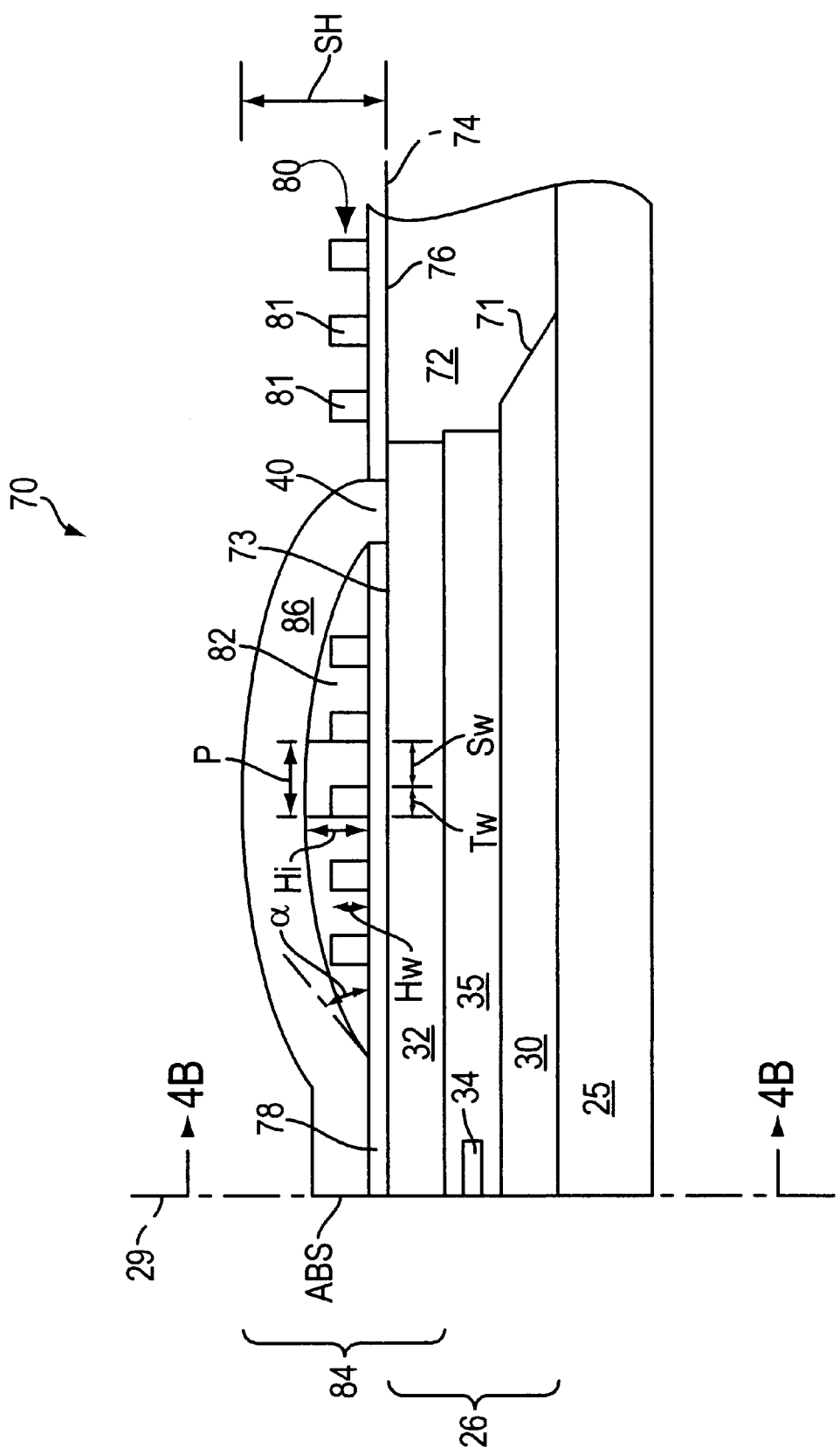
FIG. 4A is a cross-sectional side view of a write element, according to an embodiment of the present invention.
Figure 4B:
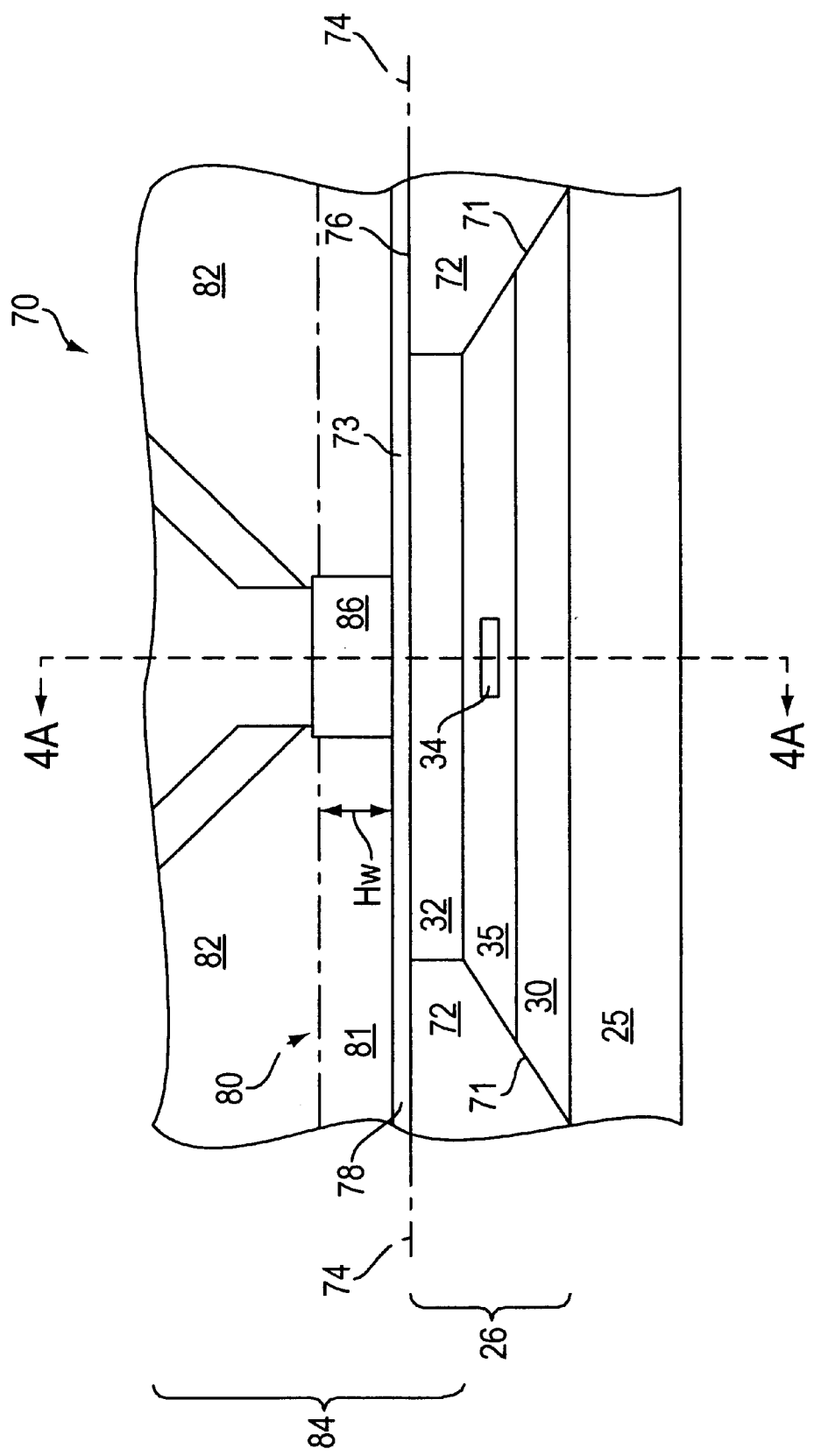
FIG. 4B is an ABS view taken along line 4B—4B of FIG. 4A.

FIG. 4A is a cross-sectional side view of a read/write head 70 according to an embodiment of the present invention. FIG. 4B is an ABS view of the read/write head 70 taken along line 4B—4B of FIG. 4A. The read/write head 70 includes a read element 26 and a write element 84 disposed above a substrate 25. As in the prior art, the read element 26 of the read/write head 70 includes a read sensor 34 in a dielectric medium 35 that is disposed between first and second shields 30, 32. The read element 26 is defined by side surfaces 71 (one shown in FIG. 4A and two others shown in FIG. 4B). Also, a planar top surface 73 of the second shield 32, which lies substantially in a plane 74, further defines the read element 26.

The read/write head 70 also includes a buildup insulation layer 72. More specifically, the buildup insulation layer 72 is disposed adjacent the read element side surfaces 71. In addition, the buildup insulation layer 72 has a substantially planar top surface 76 which also lies substantially in the plane 74. Thus, the first pole upper surface 73 and the buildup insulation layer upper surface 76 are substantially co-planar. The buildup insulation layer 72 can be formed of any suitable electrically insulating, non-magnetic material, for example alumina, $(Al_2O_3)$.

A write gap material layer 78 is disposed above the second shield 32, which operates as a first pole of the write element 84, and above the buildup insulation layer 72. The write gap material layer 78 can be formed of any suitable non-magnetic, electrically insulating material, such as alumina. Because the first pole upper surface 73 and buildup insulation layer upper surface 76 are substantially co-planar, the write gap material layer 78 is substantially planar. Above the write gap material layer 78, a coil layer 80, including multiple coil winds 81, is disposed. The coil layer 80 can be formed of any suitable conductive material, such as copper. Above and surrounding coil layer 80 is a coil insulation layer 82 formed of any suitable electrically insulating material, such as photoresistive material. Of course, other alternating layers of coil and insulation can also be included above the coil insulation layer 82 in alternative embodiments of the present invention.

Completing the write element 84 of the present invention, is a second pole 86 formed above the write gap material layer 78, and over the coil layer 80 and coil insulation layer 82. As shown in FIG. 4A, the second pole 86 extends from the ABS to, and including, the backgap portion 40 which connects to the first pole 32. The second pole 86 can be formed of the same or similar material as the first pole 32, or any other suitable magnetic material, for example NiFe.

Because the write gap material layer 78 is substantially planar, the coil layer 80 can be formed with a wind pitch P of less than 3 microns, as is further discussed below with respect to FIG. 5. In turn, because the coil layer 80 is substantially planar, the coil insulation layer 82 can be formed to cover the coil layer 80, while having an maximum height Hi that is less than in typical write elements of the prior art. Thus, the topography over which the second pole is disposed is lower, yielding a smaller stack height SH and smaller apex angle α. With the smaller apex angle α, the width W2 of the second pole 86 can be better controlled to provide a write trackwidth which supports high density applications. Further, the throat height TH can be better controlled to provide increased writing performance. These benefits of the present invention can be better understood with reference to FIG. 5 and the following related discussion.

Figure 5:
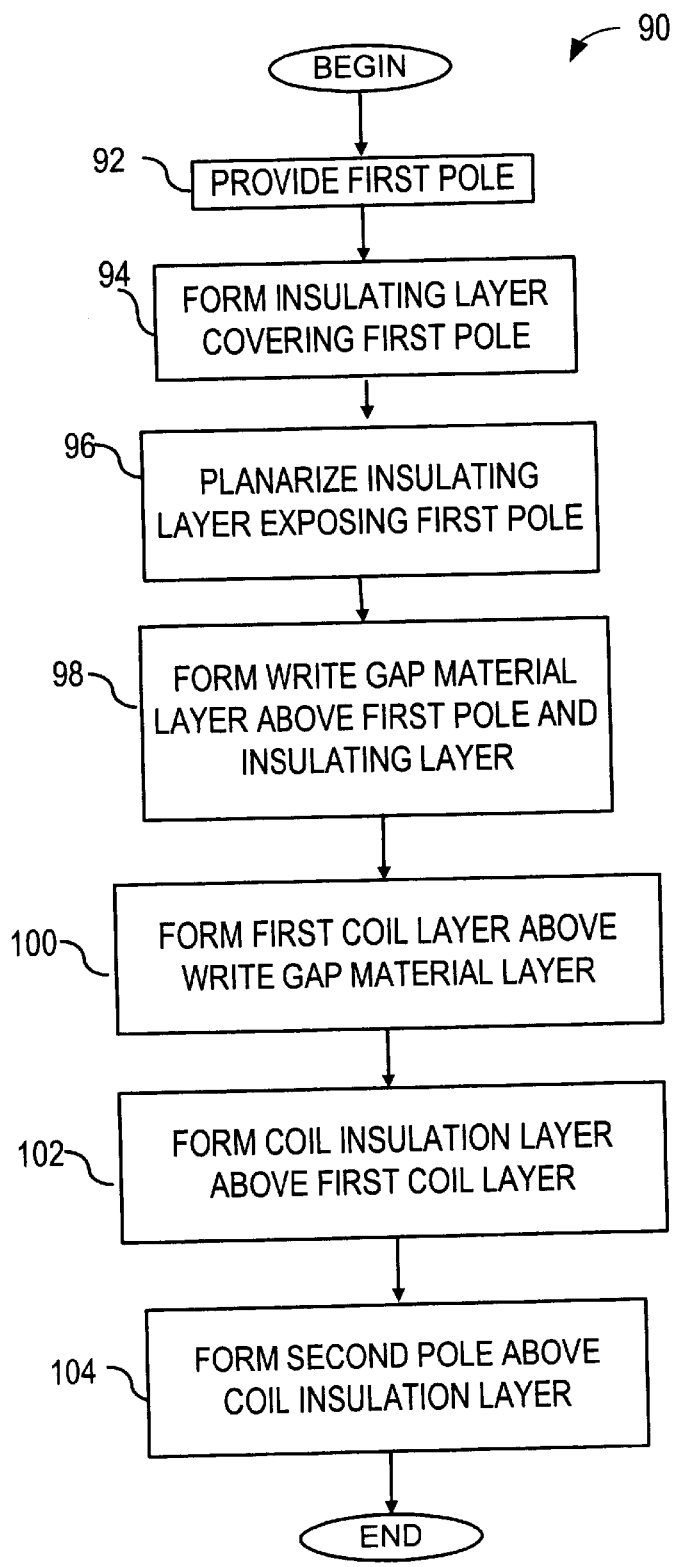
FIG. 5 is a process diagram of a method for forming a write element, according to an embodiment of the present invention.

FIG. 5 is a process diagram for a method 90 for forming a write element according to an embodiment of the present invention. In operation 92 a first pole is provided. The first pole can be formed of any suitable magnetic material, such as NiFe. An insulating layer is formed in operation 94 covering the first pole that is provided in operation 92. The insulating layer can be formed of any suitable material such as alumina. Operation 96 includes planarizing the insulation layer formed in operation 94, thereby exposing the first pole and forming a buildup insulation layer. Thus, in operation 96 an upper surface of the first pole and an upper surface of the buildup insulation layer are substantially planar and in substantially the same plane. This planarization can be accomplished using suitable techniques such as chemical-mechanical polishing (CMP), with substantially no critical tolerances. Such a process can be quicker and less expensive than other prior art methods employed to yield higher performance write elements, such as focused ion beam (FIB) milling as discussed above.

In operation 98, a write gap material layer is formed above the first pole and the buildup insulation layer. Because the upper surface of the buildup insulation layer and the upper surface of the first pole are substantially planar and in substantially the same plane due to the planarization in operation 96, the write gap material layer is also substantially planar. Formation of the write gap material layer can also include formation of a backgap via which extends through the write gap material layer and exposes the first pole.

A coil layer is formed in operation 100 above the write gap material layer of operation 98. This coil layer can be formed by first depositing and patterning photoresistive material over the write gap material layer. Because the write gap material layer is substantially planar, the photoresistive material can be more easily patterned with consistent dimensions throughout. A conductive material, such as copper, can then be plated in conjunction with the patterned photoresist. After removal of the photoresistive material, the first coil remains, formed of a plurality of coil winds having a particular pitch P which define the wind-to-wind spacing. Because of the planar deposition of the photoresistive material, the pattern dimension consistency is substantially not affected by increased wind height. Therefore, the wind height can be greater than about 1 micron and, further, greater than about 2 microns. More specifically, the wind height can be in the range of about 1 micron to about 4 microns. Such larger wind height can reduce the coil resistance due to enlarging coil cross-section, and thereby the thermal Johnson noise can be largely reduced.

Because of the pattern dimension consistency, the separation between winds and the wind pitch can be substantially consistent throughout the coil layer. Therefore, the pitch of the coil winds between the first and second pole can be substantially equal to a minimum that is desired to produce a desired yield of non-shorting coil layers. In other words, the pitch of the coil winds between the poles can be smaller in the present invention than in the described prior art. For example, the coil wind pitch can be less than one micron in the present invention. Thus, for a given yoke length, more winds can be included between the first and second poles than in the prior art. More specifically, with a yoke length of about 12 microns, about nine coil winds can be included between the first and second poles which produces a large gap field for magnetic recording density over 10 Gb/in$^2$.

Alternatively, for a given number of coil winds between the first and second poles, the yoke length can be shorter than in the prior art, and therefore exhibit a faster flux rise time. Also, with a smaller yoke length providing the same gap field as in the prior art, a smaller head inductance can be experienced. Because of this and with concomitant better impedance matching, such a write element can be used in conjunction with a preamp chip-on-suspension with a current rise time that is less than in the prior art. With such reduced current rise time, the write element of the present invention can be utilized in high data rate applications, such as 1 Gb/sec.

In operation 102 a coil insulation layer is formed above and surrounding the first coil layer that was formed in operation 100. The coil insulation layer can be formed of any suitable electrically insulating and non-magnetic material, such as photoresistive material. Because the coil layer is substantially planar, the coil insulation layer can have a maximum height that is smaller than would be needed to cover a non-planar coil layer. For example, the coil insulation layer of the present invention can be about 1.5 microns above the coil layer, with a maximum height of about 2 microns.

To further form a write element of the present invention, a second pole is formed above the coil insulation layer in operation 104. The second pole can extend through the backgap via formed in operation 98, thereby forming a backgap portion in contact with the first pole. Forming the second pole can include depositing and patterning photoresistive material above and over the write gap material layer, and the coil insulation layer. Because the write gap material layer and coil layer are substantially planar, and the coil insulation layer has a smaller height than in the prior art, and therefore the apex angle is smaller, the patterning of the photoresistive material can be more precise. For example, whereas in the prior art the coil insulation height can typically be about 12.5 microns, in the present invention this dimension can be about 2 microns. Thus, when magnetic material is plated in conjunction with the patterned photoresistive material, the trackwidth and throat height defined by the resulting second pole is more precisely controlled to provide greater write performance. In particular, trackwidths of less than 0.7 microns can be achieved to support applications of up to about 20 Gb/in.$^2$ data density. Further, more precise control of the trackwidth can contribute to a more precisely defined track density which improves mass production yield of high density recording heads. Thus, these benefits can be realized by the present invention, quicker, less expensively, and with less complexity than methods that can be used in the prior art.

In summary, the present invention provides structures and methods for providing a magnetoresistive write element that has more precisely defined trackwidth and throat height and smaller coil wind pitch, and therefore exhibits increased write performance over previous write elements. The invention has been described herein in terms of several preferred embodiments. Other embodiments of the invention, including alternatives, modifications, permutations and equivalents of the embodiments described herein, will be apparent to those skilled in the art from consideration of the specification, study of the drawings, and practice of the invention. For example, the above described write element can be incorporated with a read element to provide a read/write head, or further incorporated with other components of a disk drive system. The embodiments and preferred features described above should be considered exemplary, with the invention being defined by the appended claims, which therefore include all such alternatives, modifications, permutations and equivalents as fall within the true spirit and scope of the present invention.

What is claimed is:

1. A device for writing on a magnetic medium, comprising:
    a first pole having a front end and a back end and a substantially planar upper surface that defines a plane, said first pole being flat from said front end to said back end;
    a second pole disposed above said first pole and joined therewith at said back end;
    an insulation layer having a substantially planar upper surface that is coplanar with said plane;
    a write gap material layer disposed above said first pole and contiguous therewith from said front end to said second pole; and
    a conductive coil layer contacting said write gap material layer and having a first portion disposed between said first pole and said second pole and a second portion disposed above said insulation layer.

2. The device as recited in claim 1, wherein said write gap material layer lies above said upper surface of said insulation layer.

3. The device as recited in claim 1, wherein said insulation layer is formed of alumina.

4. The device as recited in claim 1, wherein a pitch of said coil layer is less than about 1 micron.

5. The device as recited in claim 1, wherein a thickness of said second pole is about 1.5 microns.

6. The device as recited in claim 1, wherein a yoke length of said device is about 12 microns and said conductive coil layer includes about nine winds.

7. The device as recited in claim 1, wherein a write trackwidth of said device is defined by a width of a tip portion of said second pole and is less than about 1.5 microns.

8. The device as recited in claim 1, wherein a maximum distance, perpendicular to an upper surface of said first pole, between said first pole upper surface and a surface of said second pole that faces said first pole upper surface, is less than about 5 microns.

9. The device as recited in claim 1, wherein a coil wind height of said coil layer is in the range of about 1 micron to about 4 microns.

10. A device for reading and writing data comprising:
a read/write head including
a first pole having a front end and a back end and a substantially planar upper surface that defines a plane, said first pole being flat from said front end to said back end;
a second pole disposed above said first pole and joined therewith at said back end;
an insulation layer having an upper surface that is substantially planar and coplanar with said plane;
a write gap material layer between said first and second poles and contiguous with said first pole from said front end to said second pole;
a conductive coil layer contacting said write gap material layer and including a first portion disposed above said first pole and a second portion disposed above said insulation layer;
a first shield disposed below said first pole; and
a read sensor disposed between said first shield and said first pole.

11. The device as recited in claim 10, further comprising:
a medium support that is capable of supporting a medium and moving said medium in relation to a read/write head that includes said write element and said read element; and
a read/write head support system for suspending said read/write head above said medium.

12. The device as recited in claim 11, wherein said medium support includes:
a spindle on which said medium can be supported, having an axis about which said medium can rotate; and
a medium motor connected to said spindle and capable of facilitating said moving of said medium relative to said read/write head.

13. The device as recited in claim 10, wherein said read/write head support system includes means for moving said read/write head relative to said medium.

14. A device for writing on a magnetic medium, comprising:
a first pole including a front end and a back end and a substantially planar upper surface that defines a plane, the first pole being flat from the front end to the back end;
an insulation layer including a substantially planar upper surface that is coplanar with the plane;
a write gap material layer disposed above and in contact with the first pole and contiguous therewith from the front end to the back end;
a conductive coil layer including a first portion disposed above and in contact with the write gap material layer and a second portion disposed above the insulation layer; and
a second pole disposed above the first pole and including a backgap portion joined to the first pole at the back end and disposed between the first and second portions of the conductive coil.

15. The device as recited in claim 14, wherein the write gap material layer is further disposed above the upper surface of the insulation layer.

16. The device as recited in claim 14, wherein the insulation layer is formed of alumina.

17. The device as recited in claim 14, wherein the conductive coil layer has a pitch of less than about 1 micron.

18. The device as recited in claim 14, wherein the second pole has a thickness of about 1.5 microns.

19. The device as recited in claim 14, wherein the magnetoresistive device has a yoke length of about 12 microns and the conductive coil layer includes about nine winds.

20. The device as recited in claim 14, wherein the conductive coil has a wind height in the range of about 1 micron to about 4 microns.

21. The device as recited in claim 20 wherein the wind height is between about 2 microns and about 4 microns.

22. The device as recited in claim 14 further including a coil insulation layer disposed between the second pole and the first portion of the conductive coil.

23. The device as recited in claim 22, wherein the coil insulation layer has a height of about 2 microns.

24. A device for reading and writing data, comprising:
a first pole including a front end and a back end and a substantially planar upper surface that defines a plane, the first pole being flat from the front end to the back end;
an insulation layer including a substantially planar upper surface that is coplanar with the plane;
a write gap material layer disposed above and in contact with the first pole and contiguous therewith from the front end to the back end;
a conductive coil layer including a first portion disposed above and in contact with the write gap material layer and a second portion disposed above the insulation layer;
a second pole disposed above the first pole and including a backgap portion joined to the first pole at the back end and disposed between the first and second portions of the conductive coil;
a shield disposed below the first pole; and
a read sensor disposed between the shield and the first pole.

25. The device as recited in claim 24, wherein the write gap material layer is further disposed above the upper surface of the insulation layer.

26. The device as recited in claim 24, wherein the insulation layer is formed of alumina.

27. The device as recited in claim 24, wherein the conductive coil layer has a pitch of less than about 1 micron.

28. The device as recited in claim 24, wherein the second pole has a thickness of about 1.5 microns.

29. The device as recited in claim 24, wherein the magnetoresistive device has a yoke length of about 12 microns and the conductive coil layer includes about nine winds.

30. The device as recited in claim 24, wherein the conductive coil has a wind height in the range of about 1 micron to about 4 microns.

31. The device as recited in claim 30, wherein the wind height is between about 2 microns and about 4 microns.

32. The device as recited in claim 24 further including a coil insulation layer disposed between the second pole and the first portion of the conductive coil.

33. The device as recited in claim 32, wherein the coil insulation layer has a height of about 2 microns.

34. A device, comprising:
   a first pole including
      a front end,
      a back end, and
      an upper surface that is planar from said front end to said back end and defines a plane;
   a second pole disposed above said first pole and joined therewith at said back end;
   an insulation layer including a planar upper surface that is coplanar with said plane;
   a write gap material layer disposed above said first pole and contiguous therewith from said front end to said second pole; and
   a conductive coil layer contacting said write gap material layer and including a first portion disposed between said first pole and said second pole and a second portion disposed above said insulation layer.

* * * * *